(12) United States Patent
Sureshbabu et al.

(10) Patent No.: US 12,216,714 B2
(45) Date of Patent: Feb. 4, 2025

(54) METHOD AND SYSTEM OF CLASSIFYING DOCUMENTS BASED ON LAYOUT DETERMINATION

(71) Applicant: L&T TECHNOLOGY SERVICES LIMITED, Chennai (IN)

(72) Inventors: Niveditha Sureshbabu, Bengaluru (IN); Rajesh Raj, Bengaluru (IN); Madhusudan Singh, Bangalore (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 0 days.

(21) Appl. No.: 18/544,486

(22) Filed: Dec. 19, 2023

(65) Prior Publication Data

US 2024/0411819 A1 Dec. 12, 2024

(30) Foreign Application Priority Data

Jun. 9, 2023 (IN) .............................. 202341039663

(51) Int. Cl.
| | | |
|---|---|---|
| *G06F 16/00* | (2019.01) | |
| *G06F 16/906* | (2019.01) | |
| *G06F 16/93* | (2019.01) | |
| *G06N 5/022* | (2023.01) | |

(52) U.S. Cl.
CPC ............ *G06F 16/906* (2019.01); *G06F 16/93* (2019.01); *G06N 5/022* (2013.01)

(58) Field of Classification Search
None
See application file for complete search history.

(56) References Cited

U.S. PATENT DOCUMENTS

| | | | | |
|---|---|---|---|---|
| 2014/0067631 A1* | 3/2014 | Dhuse | .................... | G06Q 40/10 705/30 |
| 2024/0020473 A1* | 1/2024 | Singh | .................... | G06V 30/412 |

FOREIGN PATENT DOCUMENTS

| | | | | |
|---|---|---|---|---|
| CN | 109657629 | * | 12/2018 | ............. G06V 10/22 |
| CN | 111709339 A | | 9/2020 | |
| CN | 113657390 B | | 8/2022 | |

* cited by examiner

*Primary Examiner* — Thu Nguyet T Le
(74) *Attorney, Agent, or Firm* — Kendal M. Sheets (57) ABSTRACT

A method and system of classifying documents is disclosed. The method includes determining line-text data for each of a plurality of lines of the document image using a text extraction technique. A set of unique keywords in the document image is determined based on a predefined list of keywords in the line-text data for each of the plurality of lines. For each keyword, two forward nodes are determined as next two subsequent keywords in the set of unique keywords based on determination of a shortest distance between the corresponding keyword and the next two subsequent keywords and based on the pre-defined reading sequence. Weights of each of the two forward nodes are determined based on the shortest distance and an angle of each of the two forward nodes with the corresponding keyword. A cluster is determined based on the feature matrix using a machine learning clustering model.

18 Claims, 11 Drawing Sheets

| PO Number Alias 302 | PO Number Rank 304 | PO Value Alias 306 | PO Value Alias 308 | PO Date Alias 310 | PO Date Alias 312 |
|---|---|---|---|---|---|
| Service Order Amendment | 1 | Amount | 2 | Approved Date | 1 |
| Purchase Order Number | 1 | Amount To | 1 | Date Issued | 1 |
| Purchase Order Number | 1 | Gross Price | 1 | Create Date | 1 |
| Statement of Work ID | 2 | Grand Total | 1 | Creation Date | 1 |
| PO No | 2 | Gross Amount | 1 | Date | 2 |

| Keywords 602 | Po No | Order dare | Delivery Address | Invoice to | Total |
|---|---|---|---|---|---|
| Po No | 0 | 0.931 | 0.99 | 0 | 0 |
| Order dare | 0 | 0 | 0.935 | 0.99 | 0 |
| Delivery Address | 0 | 0 | 0 | 0.88 | 0.485 |
| Invoice to | 0 | 0 | 0 | 0 | 0.837 |
| Total | 0 | 0 | 0 | 0 | 0 |

METHOD AND SYSTEM OF CLASSIFYING DOCUMENTS BASED ON LAYOUT DETERMINATION

TECHNICAL FIELD

This disclosure relates generally to natural language processing and document layout detection, and more particularly to a method and a system for classifying documents based on layout detection.

BACKGROUND

Multiple documents are exchanged by organizations related to various purposes. However, categorizing the documents based on the type of document becomes onerous and erroneous when done manually. Further, documents such as financial documents include information which may not have a pre-defined format or structure hence, detection and extraction of such information becomes very tricky. Layout detection based on meta data extraction is also complex in such semi structured documents. However, document layout detection is very crucial to determine layout structure and to classify them based on the layout structure and type of document.

Some available techniques may allow layout detection of a document using image processing algorithm. However, such techniques have some drawbacks like slow processing time, incorrectly identified cluster, inflexible training pipeline, high volume of training data etc.

Therefore, there is a requirement for an efficient methodology to classify documents based on layout detection.

SUMMARY OF THE INVENTION

In an embodiment, a method of classifying a document is disclosed. The method may include, determining by a processor, line-text data for each of a plurality of lines of the document using a text extraction technique. The processor may further determine a set of unique keywords in the document from a predefined list of keywords based on detection of at least one alias corresponding to each of the set of keywords in the line-text data for each of the plurality of lines. In an embodiment, the set of unique keywords may be determined in a pre-defined reading sequence of the plurality of lines of the document. The processor may further determine a feature matrix for the set of unique keywords by determining two forward nodes for each keyword in the set of unique keywords as next two subsequent keywords in the set of unique keywords based on determination of a shortest distance between position of the corresponding keyword and positions of the next two subsequent keywords and based on the pre-defined reading sequence. In order to determine the feature matrix the processor may further determine weights of each of the two forward nodes for each keyword in the set of unique keywords based on the shortest distance and an angle of each of the two forward nodes with respect to the corresponding keyword. The processor may further determine a document layout of the document by determining a cluster from a plurality of clusters based on the feature matrix using a machine learning clustering model. In an embodiment, the each of the plurality of clusters may correspond to a unique document layout from a plurality of document layouts. In an embodiment, the machine learning clustering model is trained based on training data including a plurality of documents corresponding to each of the plurality of document layouts.

In another embodiment, a system of classifying a document is disclosed. The system may include a processor, a memory communicatively coupled to the processor, wherein the memory may store processor-executable instructions, which when executed by the processor may cause the processor to determine line-text data for each of a plurality of lines of the document using a text extraction technique. The processor may further determine a set of unique keywords in the document from a predefined list of keywords based on detection of at least one alias corresponding to each of the set of keywords in the line-text data for each of the plurality of lines. In an embodiment, the set of unique keywords may be determined in a pre-defined reading sequence of the plurality of lines of the document. The processor may further determine a feature matrix for the set of unique keywords by determining two forward nodes for each keyword in the set of unique keywords as next two subsequent keywords in the set of unique keywords based on determination of a shortest distance between position of the corresponding keyword and positions of the next two subsequent keywords and based on the pre-defined reading sequence. Further, in order to determine the feature matrix, the processor may further determine weights of each of the two forward nodes for each keyword in the set of unique keywords based on the shortest distance and an angle of each of the two forward nodes with respect to the corresponding keyword. The processor may further determine a document layout of the document by determining a cluster from a plurality of clusters based on the feature matrix using a machine learning clustering model. In an embodiment, the each of the plurality of clusters may correspond to a unique document layout from a plurality of document layouts. In an embodiment, the machine learning clustering model may be trained based on training data including a plurality of documents corresponding to each of the plurality of document layouts.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope being indicated by the following claims.

Since documents may include data in various formats, categorization of such documents becomes a complex task. The present disclosure provides a methodology for categorizing a document based on layout determination.

Figure 1:
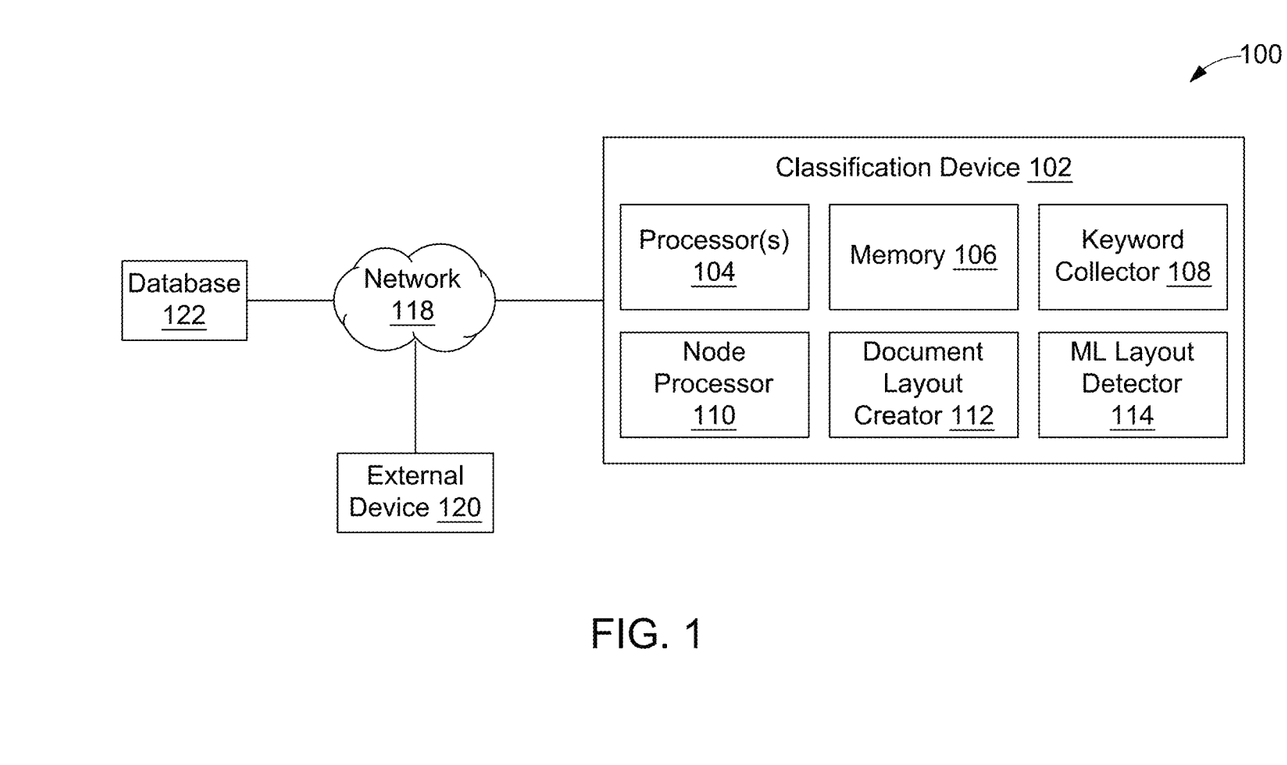
FIG. 1 illustrates a block diagram of an exemplary document classification system for classifying documents based on layout determination, in accordance with some embodiments of the present disclosure.

Referring now to FIG. 1, a block diagram of an exemplary document classification system 100 for classifying documents based on layout determination, in accordance with some embodiments of the present disclosure is illustrated. The document classification system 100 may include a classification device 102, an external device 120, and a database 122 communicably coupled to each other through a wired or a wireless communication network 118. The classification device 102 may include a processor 104 and a memory 106. In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors. The memory 106 may store instructions that, when executed by the processor 104, cause the processor 104 to classify documents based on layout determination, as discussed in greater detail below. The memory 106 may be a non-volatile memory or a volatile memory. Examples of non-volatile memory may include but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

In an embodiment, the classification device 102 may include a keyword collector 108, a node-processor 110, a document layout creator 112, and ML layout detector 114. The database 122 may be enabled in a cloud or a physical database comprising one or more document comprising text data. In an embodiment, the database 120 may store data inputted by an external device 120 or generated by the classification device 102. In an embodiment, the document may include, but not limited to, images of documents which may be digitally scanned or created as digital PDF documents.

In an embodiment, the communication network 118 may be a wired or a wireless network or a combination thereof. The network 118 can be implemented as one of the different types of networks, such as but not limited to, ethernet IP network, intranet, local area network (LAN), wide area network (WAN), the internet, Wi-Fi, LTE network, CDMA network, and the like. Further, network 118 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further network 118 can include a variety of network devices, including routers, bridges, servers, computing devices, storage devices, and the like.

In an embodiment, the classification device 102 may receive a request for classifying a document from the external device 120 through the network 118. In an embodiment, the external device 120 may be a computing system, including but not limited to, a smart phone, a laptop computer, a desktop computer, a notebook, a workstation, a portable computer, a personal digital assistant, a handheld, a scanner, or a mobile device. In an embodiment, the classification device 102 may be, but not limited to, in-built into the external device 120 or a standalone computing device.

By way of an example, the key-word collector 108 may determine line-text data for each of a plurality of lines of the document using a text extraction technique. The key-word collector 108 may further determine a set of keywords in the document based on a predefined list of keywords. In an embodiment, the keywords in the line-text data may be determined based on detection of at least one alias corresponding to at least one of the keywords for each of the plurality of lines. The set of unique keywords may be determined in a pre-defined reading sequence of the plurality lines of the document. Each of the plurality of document types corresponds to a predefined unique set of keywords and a pre-defined number of keywords. In an embodiment, a predefined list of keywords may include a plurality of aliases corresponding to each of the predefined keywords. In an embodiment, each of the plurality of aliases corresponding to each of the predefined keyword may be assigned a pre-defined search priority. Each keyword in the set of unique keywords may be determined based on the pre-defined search priority of the at least one alias from the plurality of aliases. Accordingly, in case an alias with higher search priority is detected in the line-text data the search for the keyword is stopped and detection of an alias corresponding to another keyword is initiated.

In an embodiment, prior to detection of the set of keywords by the keyword collector 108, the node processor 110 may detect the at least one alias in the plurality of line-text data by splitting the line-text data into one or more tokens based on detection of a predefined delimiter and/or an n-gram technique. In an embodiment, the n-gram technique may include, but not limited to, bigram, trigram, etc. The node processor 110 may also determine coordinate positions of each of the aliases corresponding to the keywords and each of the one or more tokens of the line-text data in the document.

Further, the document layout creator 112 may determine two forward nodes for each keyword in the set of unique keywords. The two forward nodes may be determined as next two subsequent keywords in the set of unique keywords based on determination of a shortest distance between position of the corresponding keyword and positions of the next two subsequent keywords and based on the pre-defined reading sequence. The document layout creator 112 may determine weights of each of the two forward nodes based on the shortest distance and an angle of each of the two forward nodes with respect to the corresponding keyword. Further, the document layout creator 112 may determine a feature matrix for the set of unique keywords by multiplying an adjacency matrix with the weights of each of the two forward nodes based on the shortest distance. In an embodiment, the feature matrix may be a 2-dimensional matrix and may be converted to one dimensional array in order to be fed into the ML layout detector 114.

Further, the ML layout detector 114 may determine a cluster of the layout based on the one-dimensional array of the feature matrix using a machine learning clustering model. The machine learning clustering model may include but not limited to K-means, agglomerative hierarchy, DBSCAN, BIRCH, Gaussian Mixture Model, etc. The each of the plurality of clusters may correspond to a unique document layout from a plurality of document layouts and the machine learning clustering model may be trained based on training data including a plurality of documents corresponding to each of the plurality of document layouts.

In an embodiment, the ML layout detector 114 may determine the cluster from the plurality of clusters based on the detected layout. In an embodiment, the plurality of clusters may be determined by the ML layout detector 114 based on unique document layouts determined earlier. Hence, the layout detection ML module 226 may compare the centroid distance of the layout of the document with all the centroid distances of the existing clusters of each of the plurality of document layouts and based on the determination of a closest match may determine a cluster for the document based on the layout determined. A cluster for the document may be selected, in case, difference of the centroid distance of the layout of the document with the centroid distance of an existing cluster corresponding to predefined document layouts is determined to be less than a threshold level. If in case the centroid distance is greater than the threshold level a new cluster may be created for clustering the document based on the determined layout of the document.

Figure 2:
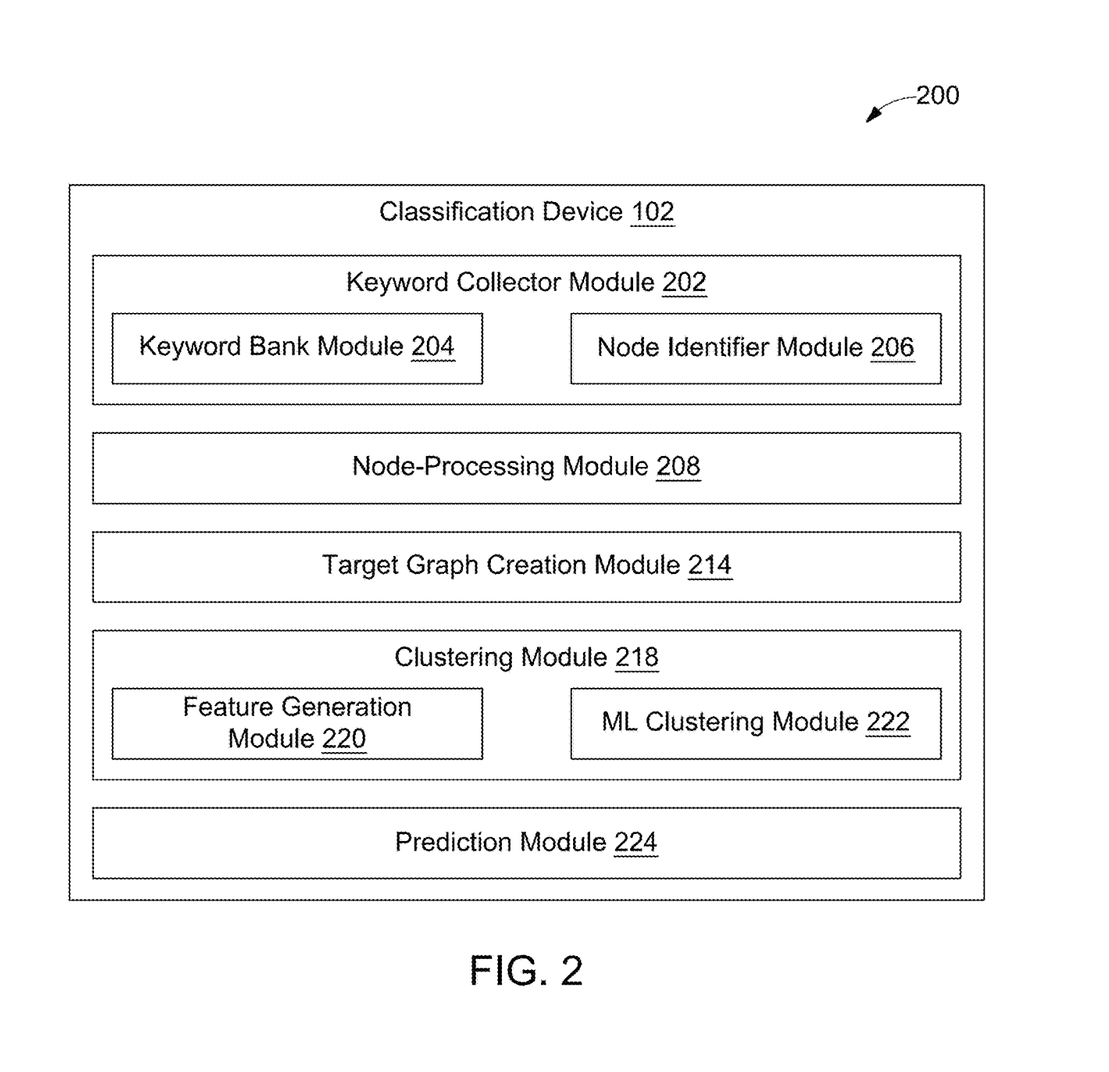
FIG. 2 is a functional block diagram of the classification device, in accordance with some embodiments of the present disclosure.

Referring now to FIG. 2, a functional block diagram of the classification device 102, in accordance with some embodiments of the present disclosure. In an embodiment, the classification device 102 may include a keyword collector module 202, a node-processing module 208, a target graph creation module 214, a clustering module 218, a prediction module 224.

Figure 3:
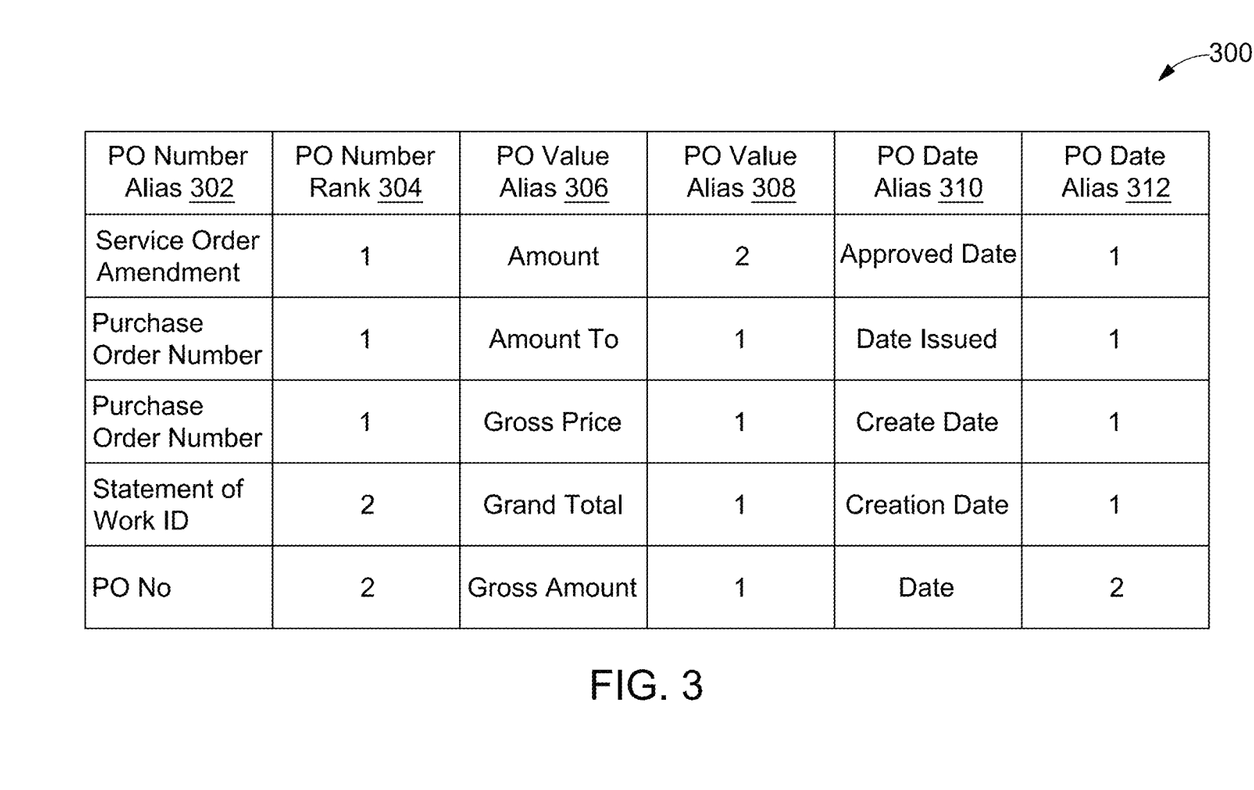
FIG. 3 depicts an exemplary predefined list of keywords and their aliases, in accordance with an embodiment of the present disclosure.
Figure 4:
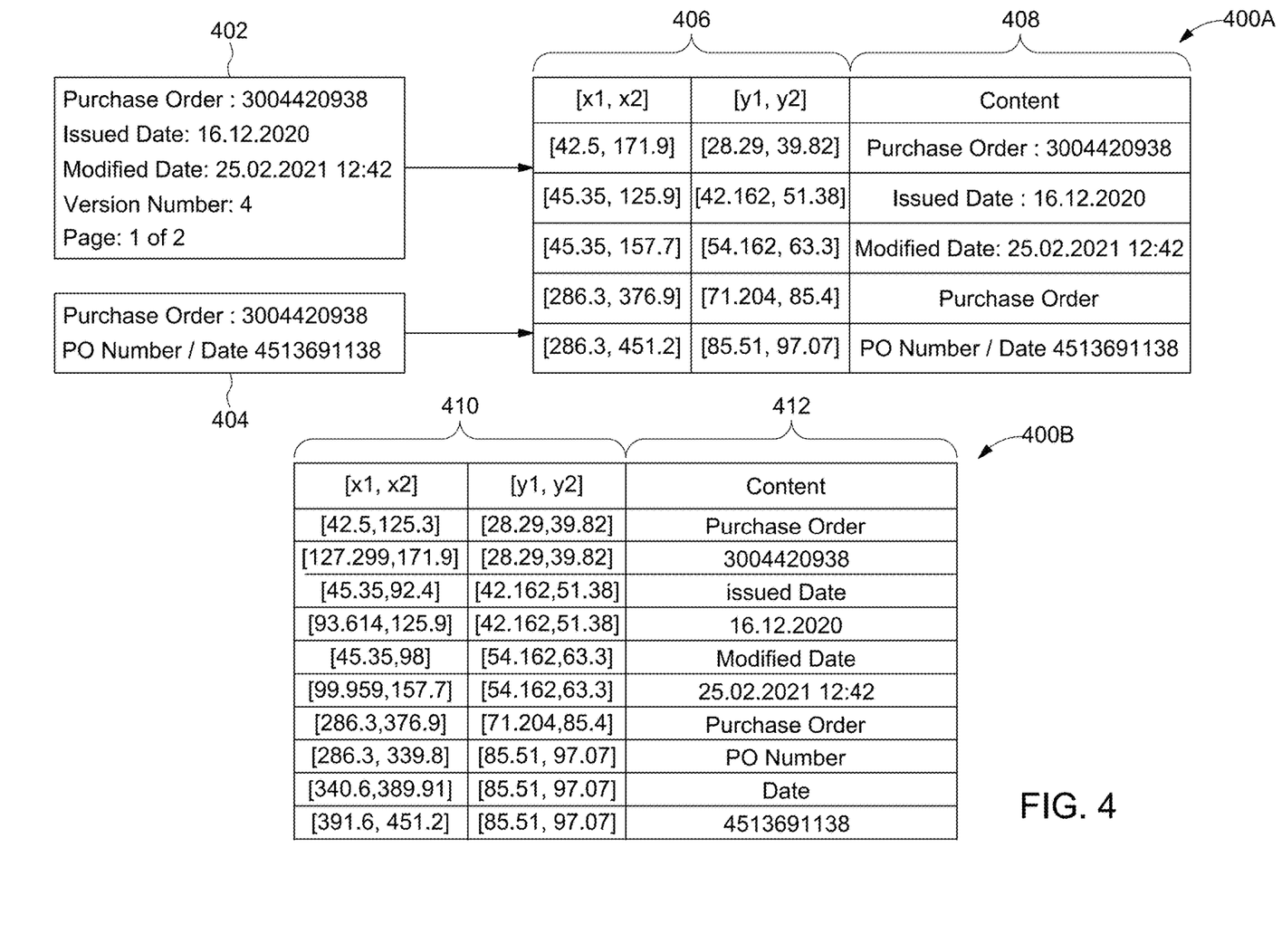
FIG. 4 illustrates a table with exemplary line-text data extracted from a document image and a table with node-processed line-text data, in accordance with an embodiment of the present disclosure.

The keyword collector module 202 may be implemented in the keyword collector 108 and may determine the line-text data for each of the plurality of lines of the document using a text extraction technique. The text extraction technique may include, but not limited to, Optical Character Recognition (OCR) technique, etc. The keyword collector module 202 may further sub-include a keyword bank module 204, and a node identifier module 206. The keyword bank module 204 may include a predefined list of keywords 300 and their respective aliases each assigned with a pre-defined search priority. Referring now to FIG. 3, a table 300 depicting an exemplary predefined list of keywords along with their corresponding aliases and search priority is illustrated, in accordance with an embodiment of the present disclosure. Table 300 provides a predefined list of keywords such as "PO Number", "PO Value" and "PO Date". Accordingly, columns 302, 306 and 312 list the corresponding aliases of the keywords and columns 304, 308 and 312 list the search priority of each of the aliases of the keywords. Further, the node identifier module 206 may detect at least one alias from the plurality of aliases by splitting the line text data into one or more tokens based on detection of a predefined delimiter and/or n-gram technique. In an embodiment, the predefined delimiter may be, but not limited to, back slash, forward slash, hyphen, etc. In an embodiment, the n-gram technique may include but not limited to, bi-gram, tri-gram, etc. based on detection of words frequently occurring together. Further, the node identifier module 206 may detect the set of keywords by detecting at least one alias from the list of aliases 302, 306 and 310 based on their search priority columns 304, 308 and 312. Once an alias with a higher priority is found the search is stopped for the corresponding keyword and the corresponding keyword for which the alias was found is added to the set of unique keywords. In an embodiment, the aliases in the line-text data are looked up using, but not limited to, a universal sentence encoder which may determine a similarity score based on which the set of unique keywords in the document may be collected. Referring now to FIG. 4, table 400A shows exemplary line-text data extracted from a documents and table 400B shows node-processed line-text data, in accordance with an embodiment of the present disclosure. The table 400A comprises line-text data extracted from a plurality of documents 402, 404. The table 400A may include content 408 extracted for each line and their corresponding positional coordinate information 406. Further, the content 408 of the table 400A may be processed by the node-processing module 208 to determine content 412 of the table 400B, by splitting the line-text data 408 for each line of the documents 402 and 404 based on one or more predefined delimiter and/or n-gram technique. Accordingly, in table 400B, content 412, extracted based on splitting the line-text data, such as "Purchase Order: 3004420938" may be determined as "Purchase Order" and "3004420938". The node-processing module 208 may further determine the corresponding positional coordinates 410 of the spitted line-text data 412. The keywords may be determined from the spitted line-text data 412-based on looking up at least one alias from the table 300 of the predefined list of keywords. For example, as shown in table 400B "PO Number/Date" are two keys which are split as "PO Number" and "Date" by the node-processing module 208 and their corresponding positional coordinates x(x1, x2) and y(y1, y2) 410 may be determined.

Accordingly, the node-processing module 208 may determine a set of unique keywords in the documents 402 and 404 based on the predefined list of keywords 300 by detection of at least one alias 302, 306 and 310 corresponding to each of the set of keywords in the splitted line-text data 412 for each of the plurality of lines. The set of unique keywords may be determined in the pre-defined reading sequence of the plurality of lines of the document. In an embodiment, the pre-defined reading sequence may be, left to right or right to left. Each keyword in the set of unique keywords may be determined based on the pre-defined search priority 304, 308 and 312 of the at least one alias from the plurality of aliases. In an embodiment, each document layout type may include a predefined set of keywords and a predefined number of set of keywords. For example, documents related to type "purchase order" may include keywords "PO Number", "PO Value" and "PO Date" and the predefined number of keywords for documents related to type "purchase order" may be predefined as three. Similarly, not limited to above example, different types of documents may have different predefined set of keywords and a predefined number of set of keywords.

Further, the target graph creation module 214 may be implemented in the document layout creator 112. The target graph creation module 214 may determine a document layout by determining two forward nodes for each keyword in the set of unique keywords determined. The two forward nodes for a keyword may be determined as next two subsequent keywords in the set of unique keywords based on determination of a shortest distance between position of the corresponding keyword and positions of the next two subsequent keywords and based on the pre-defined reading sequence. In an embodiment, the shortest distance between position of the corresponding keyword and positions of the next two subsequent keywords is calculated by determining a distance between a center point determined based on position coordinates 410 of each keyword.

Figure 5:
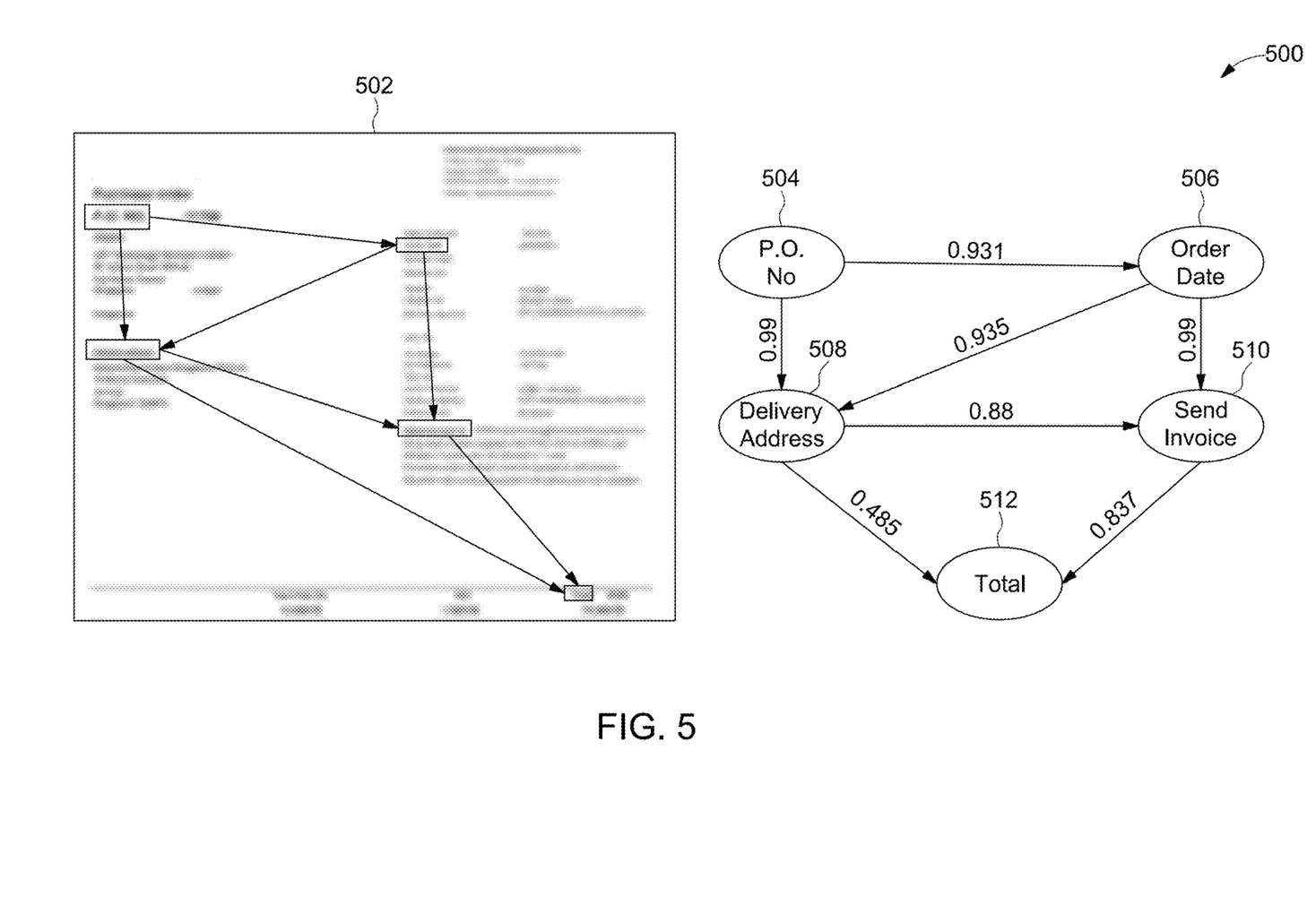
FIG. 5 illustrates an exemplary creation of document layout, in accordance with an embodiment of the present disclosure.

Referring now to FIG. 5, an exemplary document layout 500 is depicted, in accordance with an embodiment of the present disclosure. The document layout 500 is determined based on a set of unique keywords determined from the document 502. The document layout 500 includes connection of each of the set of unique keywords as per two forward directed connection without any duplicate and backward connection among keywords. Accordingly, document layout created for each document based on the unique set of keywords detected in the document may be a geometrical structure which may be utilized to determine a layout of the document. As shown in FIG. 5, the keywords 504, 506, 508, 510, 512 are identified in the document 502 based on their coordinate positions in the document. The keywords are determined in a hierarchy of the predefined reading sequence for example left to right and top to bottom of the document. Accordingly, for keyword node 504 two forward nodes are determined as 506 and 508 based on shortest distance and/or the predefined reading sequence from the keyword node 504. Accordingly, for keyword node 506, two forward nodes are determined as 508 and 510. For keyword node 508, two forward nodes are determined as 510 and 512 and so on. The weight for each two forward nodes for each of the corresponding keywords are determined based on the shortest distance and the relative angle between each of the two forward nodes and the corresponding keyword.

Figure 6:
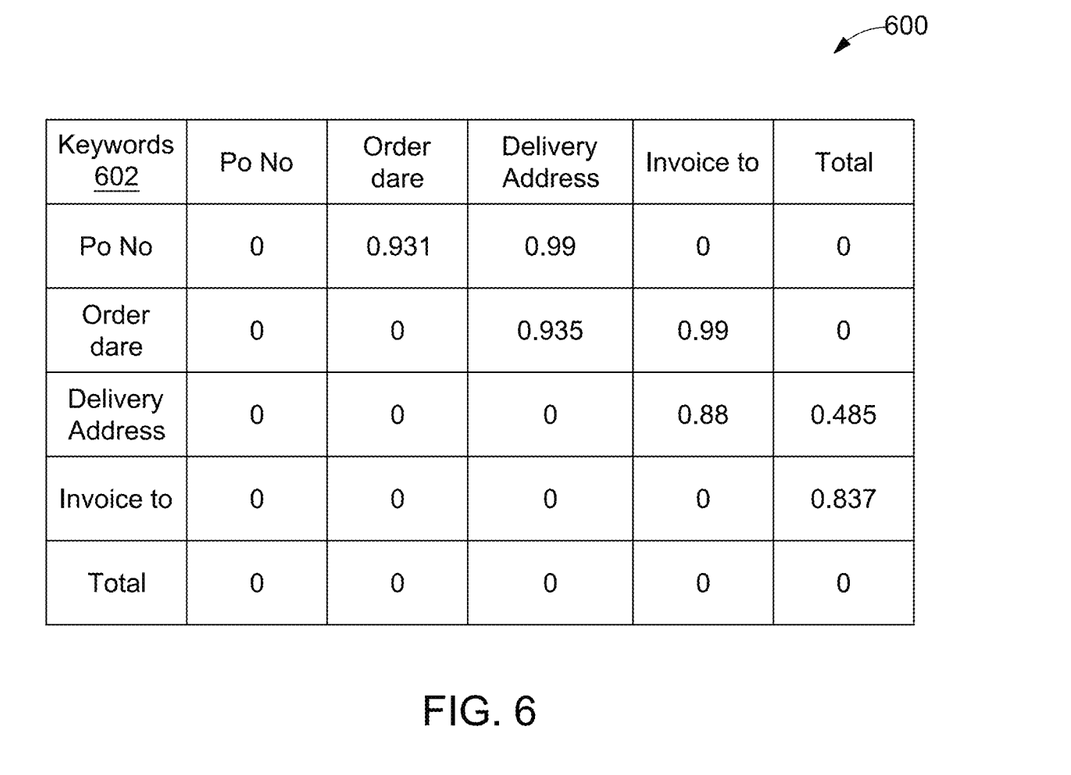
FIG. 6 depicts an exemplary feature matrix based on the document layout of the document image, in accordance with an embodiment of the present disclosure.

Further, the clustering module 218 may be implemented in the ML layout detector 114 and further sub-include a feature generation module 220 and an ML clustering module 222. The feature generation module 220 may determine a feature matrix based on the document layout determined for a document by the target graph creation module 214. The feature matrix may be a 2-dimensional matrix depicting the weights of each of the two forward nodes for each keyword in the set of unique keywords based on the shortest distance and an angle of each of the two forward nodes with respect to the corresponding keyword. Referring now to FIG. 6, an exemplary feature matrix 600 is depicted based on the document layout of the document 502, in accordance with an embodiment of the present disclosure. The table 600 depicts keywords 602 determined in the document 502 determined based on the reading of the document based on the pre-defined reading sequence in the top row and first column. For each keyword the weights determined for its corresponding two forward nodes are depicted based on the two forwards connection methodology explained earlier.

In an embodiment, the weights of each of the two forward nodes are determined based on the shortest distance and an angle of each of the two forward nodes with respect to the corresponding keyword. Further, the feature generation module 220 may determine a feature matrix for the set of unique keywords by multiplying an adjacency matrix with the weights of each of the two forward nodes based on shortest distance and angle between the two forward nodes. In an embodiment, the feature matrix 600 may be converted to one dimensional array in order to feed the one-dimensional feature matrix into the ML clustering module 222.

Figure 7:
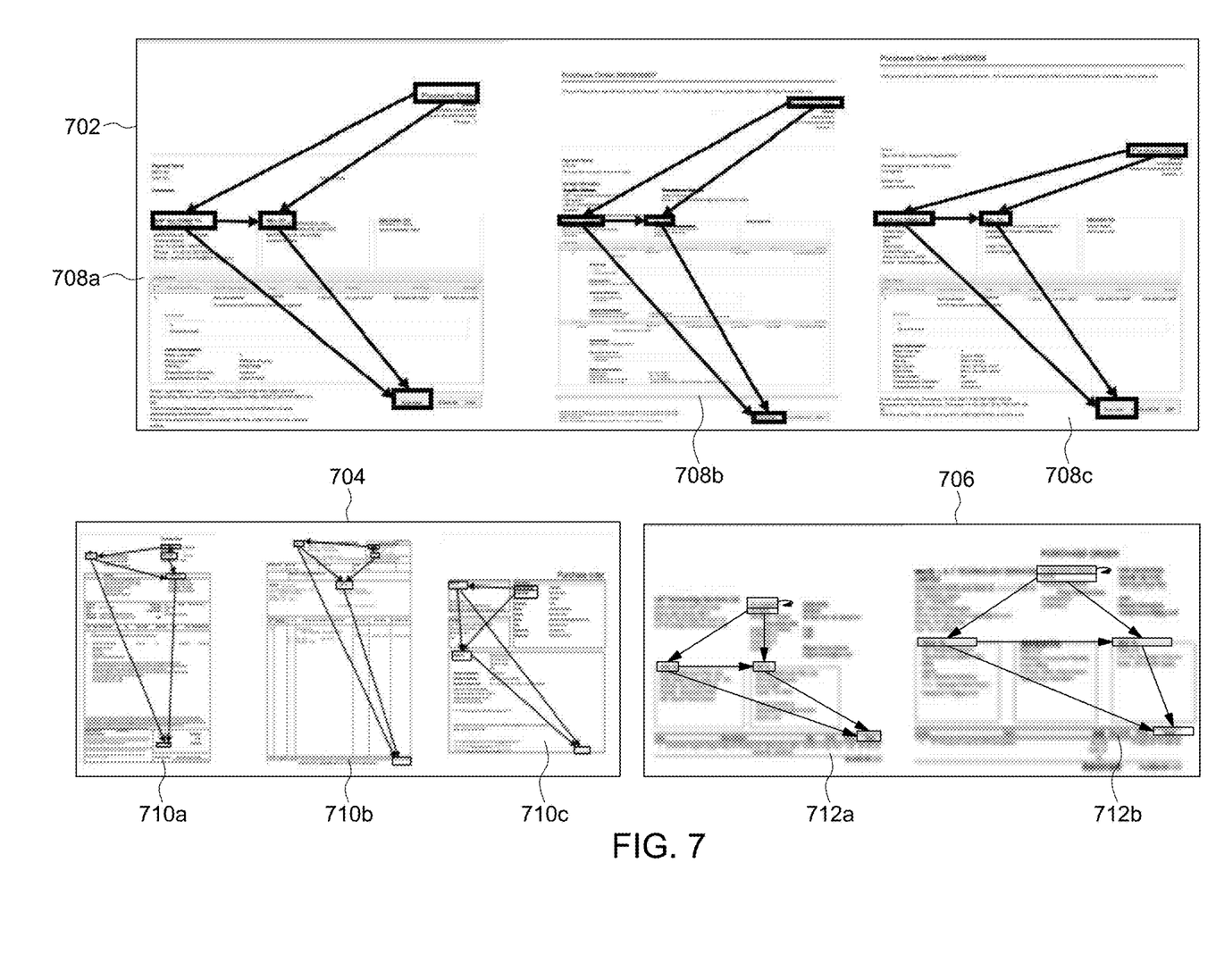
FIG. 7 illustrates exemplary clusters created based on various document layouts, in accordance with an embodiment of the present disclosure.

The ML clustering module 222 may further determine a cluster of the layout based on the one-dimensional feature matrix using a machine learning clustering model. In an embodiment, the machine learning clustering model may be selected as, but not limited to, K-means, agglomerative hierarchy, DBSCAN, BIRCH, Gaussian Mixture Model, etc. In an embodiment, each of the plurality of clusters corresponds to a unique document layout from a plurality of document layouts determined based on their corresponding document layouts. The ML clustering module 222 may be trained based on training data corresponding to a plurality of documents corresponding to each of the plurality of the document layouts. In an embodiment, in case a document is input for which no cluster is already defined, a new cluster may be generated based on determination of the document layout. Referring now to FIG. 7, exemplary clusters created based on various document layouts of documents are depicted, in accordance with an embodiment of the present disclosure. A first cluster 702 may be determined based on similar document layouts detected in documents 708a, 708b and 708c. Further, a second cluster 704 may be determined based on similar document layout detected in documents 710a, 710b and 710c. Further, third cluster 706 may be determined based on determination of similar document layout in documents 712a and 712b. Accordingly, for each of the clusters 702, 704 and 706 the documents having similar document layout may be determined based on centroid identification and based on their similar geometry information for the target nodes in each document. In an embodiment, documents belonging to a particular entity may include a particular layout. Accordingly, the cluster corresponding to a particular layout may also represent documents belonging to a particular entity.

Figure 8A:
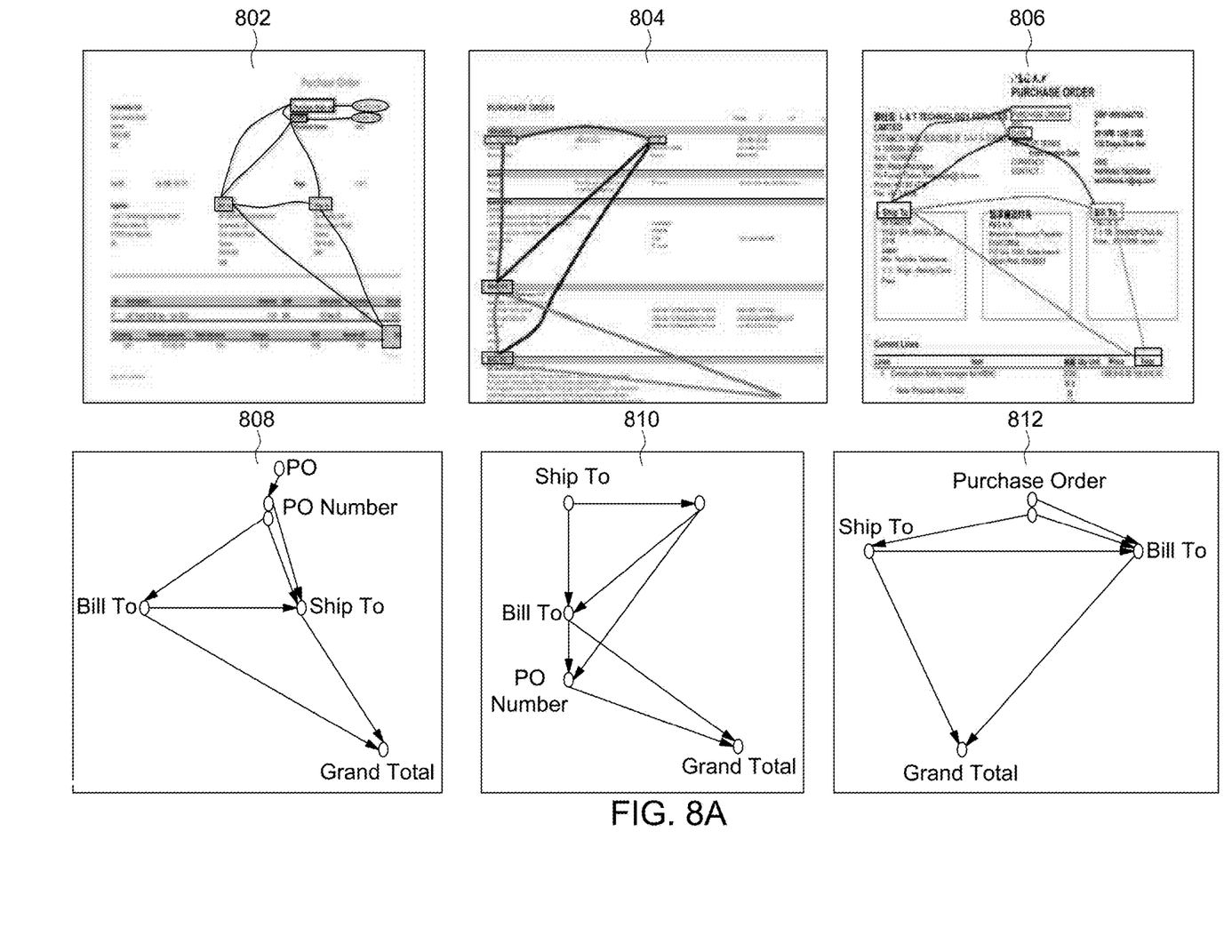
FIG. 8A illustrates exemplary training document images and their corresponding document layouts, in accordance with an embodiment of the present disclosure.
Figure 8B:
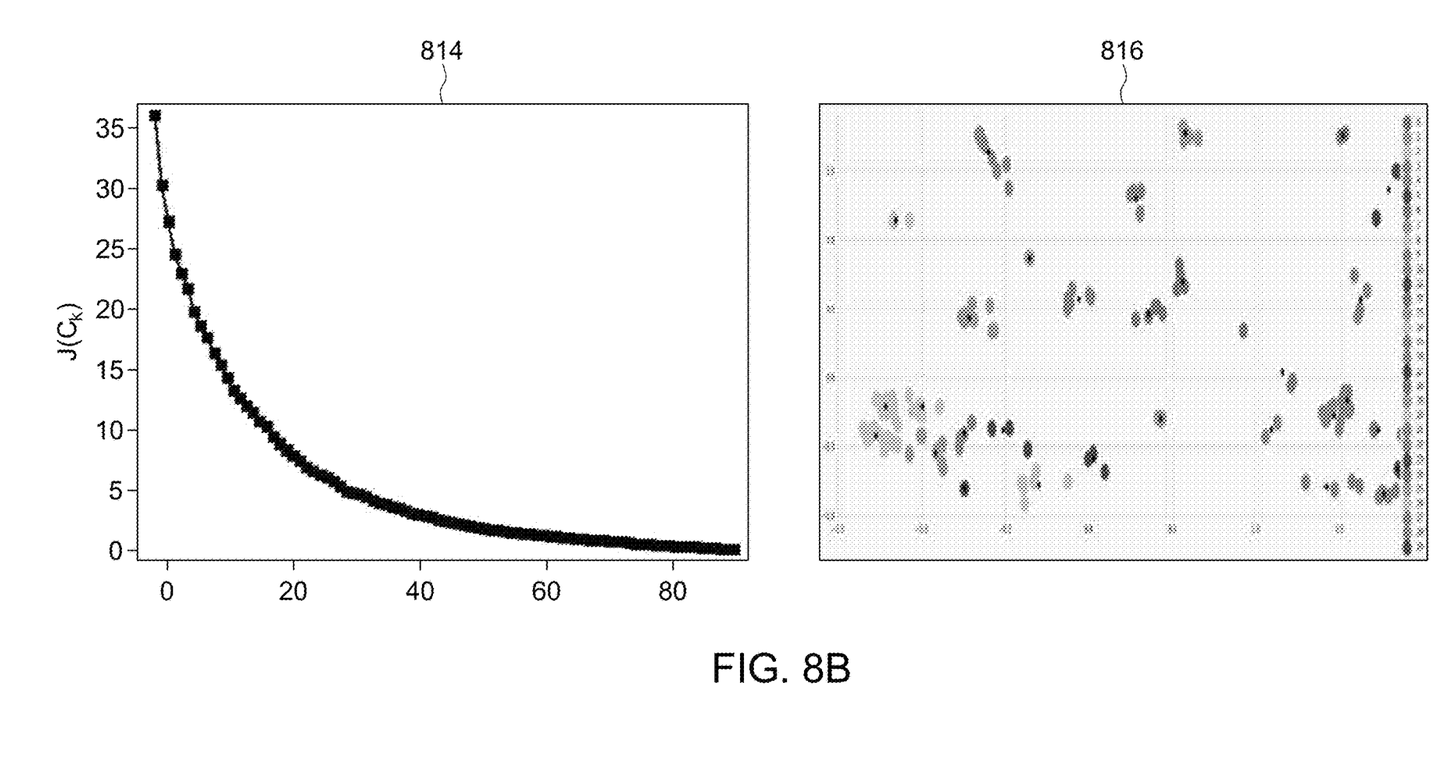
FIG. 8B illustrates determination of a number of clusters and a cluster graph for the exemplary training document images, in accordance with an embodiment of the present disclosure.

FIG. 8A illustrates exemplary training documents and their corresponding document layouts, in accordance with an embodiment of the present disclosure. In an embodiment, exemplary training data comprising a plurality of documents 802, 804, 806, etc. corresponding to each of different document layouts 808, 810, 812, etc. may be input into the ML clustering module 222. FIG. 8B illustrates determination of a number of clusters and a cluster graph for the exemplary training documents, in accordance with an embodiment of the present disclosure. A cluster analysis may be performed based on the training documents 802, 804, 806, etc. and a number of clusters may be determined based on elbow method based on a plot 814 determined based on number of clusters and a function variation for the number of clusters. A cluster graph 816 depicts a plurality of clusters determined based on a centroid distance of each of the plurality of document layouts determined based on their corresponding document layouts.

Figure 8C:
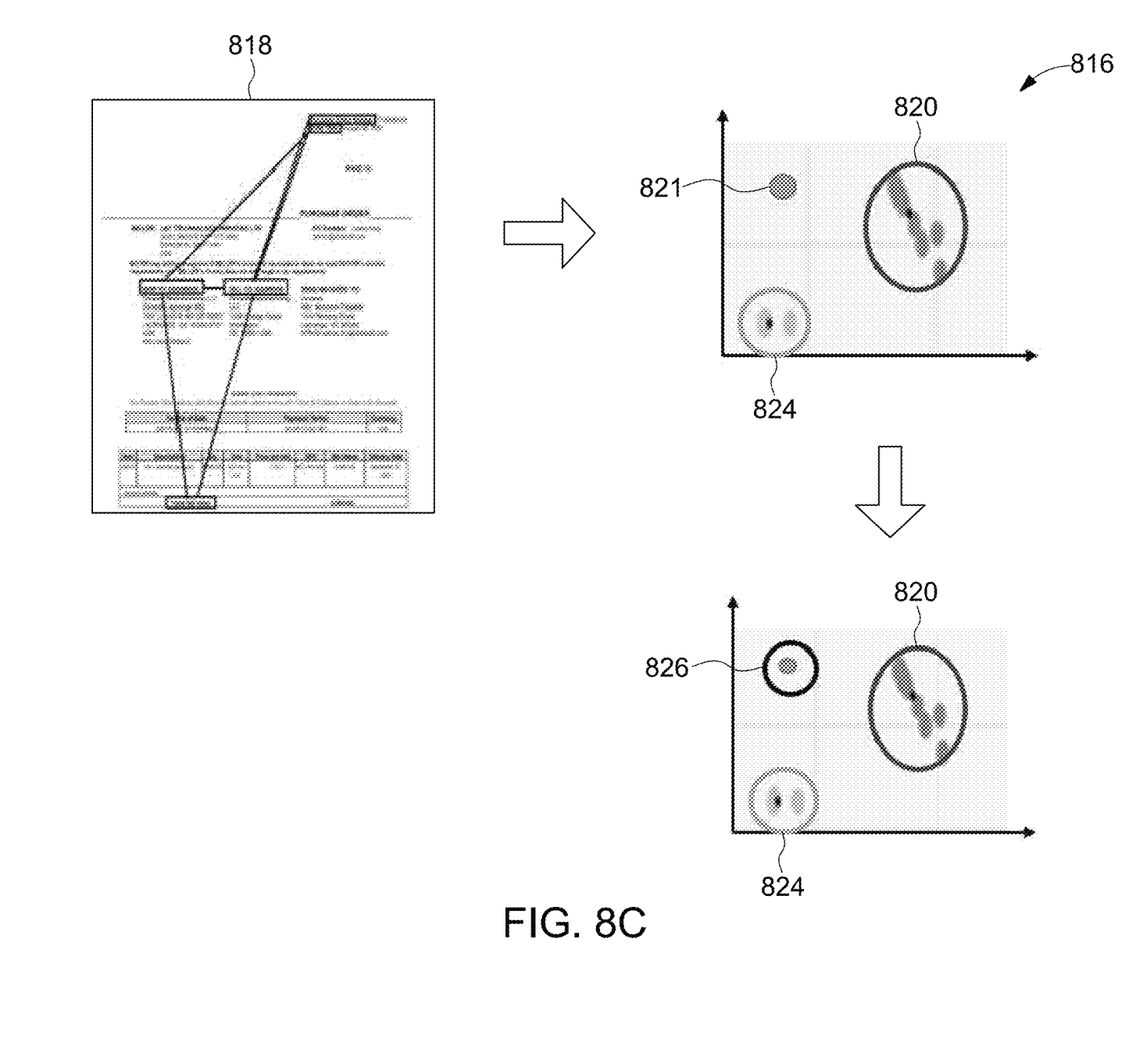
FIG. 8C illustrates determination of a new cluster, in accordance with an embodiment of the present disclosure.

In an embodiment, each of the plurality of clusters corresponds to a unique document layout from a plurality of document layouts. FIG. 8C illustrates determination of a new cluster, in accordance with an embodiment of the present disclosure. In an exemplary scenario, in case the document layout of the documents 818 may not be mapped to any of the pre-defined clusters, the prediction module 224 may upon determining the layout of the document 818 may determine a new cluster based on the cluster graph 816. Further, the prediction module 224 may determine a new cluster for the newly detected document layout of the document 818 in the cluster graph 816. The prediction module 224 may compare the distance of new document layout with the centroid distance of all the existing clusters corresponding to each of the document layouts. If in case the difference of the centroid distance of new document layout as compared to the centroid distance of the existing document layouts is greater than pre-defined threshold, then new cluster may be created along with its threshold. Referring now to FIG. 8C, depicts mapping of the document layout of the document 818 on the cluster graph 816 as cluster 821. Further, a threshold 826 may be determined for the new cluster 821 based on predefined threshold range criteria. Accordingly, a new cluster 826 may be defined for the document layout of the document 818.

Figure 9:
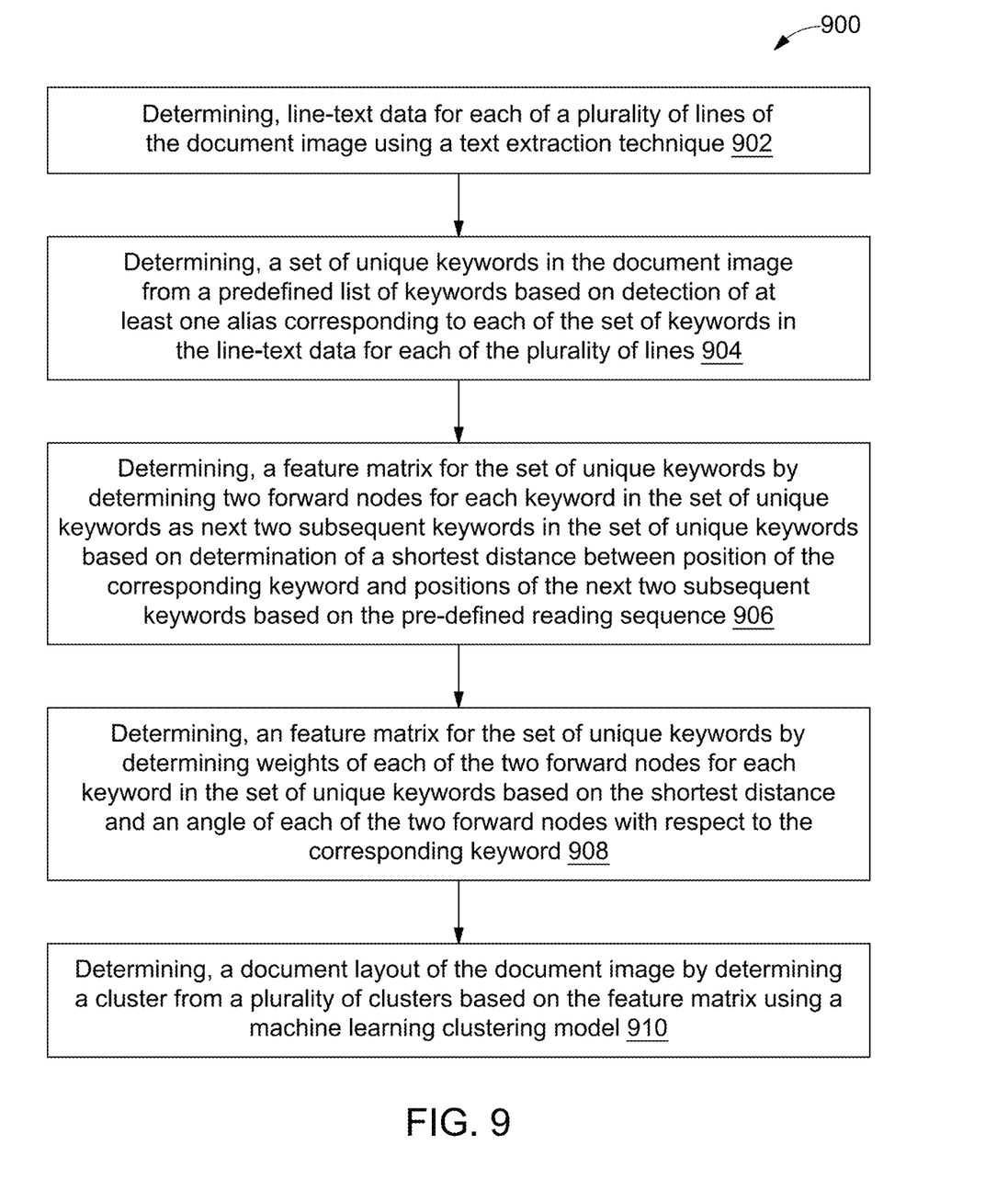
FIG. 9 is a flowchart of a method for classifying documents based on layout determination, in accordance with some embodiments of the present disclosure.

Referring now to FIG. 9, a flowchart of a method for classifying documents based on layout determination is depicted, in accordance with some embodiments of the present disclosure. In an embodiment, method 900 may include a plurality of steps that may be performed by the processor 104 to classify a document based on layout determination.

At step 902, the processor 104 may determine line-text data for each of a plurality of lines of the document using a text extraction technique. Further at step 904, the processor 104 may determine a set of unique keywords in the document from a predefined list of keywords based on detection of at least one alias corresponding to each of the set of keywords in the line-text data for each of the plurality of lines. In an embodiment, the set of unique keywords may be determined in a pre-defined reading sequence of the plurality of lines of the document. In an embodiment, the pre-defined list of keywords comprises a plurality of aliases corresponding to each of keyword and each of the plurality of aliases may be assigned a pre-defined search priority. Accordingly, each keyword in the set of unique keywords may be determined based on the pre-defined search priority of the at least one alias from the plurality of aliases.

Further at step 906, the processor 104 may determine a feature matrix for each of the set of unique keywords by determining two forward nodes for each keyword in the set of keywords as next two subsequent keywords in the set of unique keywords based on determination of a shortest distance between position of the corresponding keyword and positions of the next two subsequent keywords and based on the pre-defined reading sequence. Further at step 908, the processor 104 may determine weights of each of the two forward nodes for each keyword in the set of unique keywords based on the shortest distance and an angle of each of the two forward nodes with respect to the corresponding keyword.

Further at step 910, the processor 104 may determine a cluster from a plurality of clusters based on the feature matrix using a machine learning clustering model. In an embodiment, the each of the plurality of clusters correspond to a unique document layout from a plurality of document layout. Further, the machine learning clustering model may be trained based on training data corresponding to a plurality of documents corresponding to each of the plurality of document layouts.

It is intended that the disclosure and examples be considered as exemplary only, with a true scope of disclosed embodiments being indicated by the following claims.

What is claimed is:

1. A method of classifying a document, the method comprising:
   determining, by a processor, line-text data for each of a plurality of lines of the document using a text extraction technique;
   determining, by the processor, a set of unique keywords in the document from a predefined list of keywords based on detection of at least one alias corresponding to each of the set of keywords in the line-text data for each of the plurality of lines,
      wherein the set of unique keywords are determined in a pre-defined reading sequence of the plurality of lines of the document;
   determining, by the processor, a feature matrix for the set of unique keywords by:
      for each keyword in the set of unique keywords:
         determining, by the processor, two forward nodes as next two subsequent keywords in the set of unique keywords based on determination of a shortest distance between position of the corresponding keyword and positions of the next two subsequent keywords and based on the pre-defined reading sequence;
         determining, by the processor, weights of each of the two forward nodes based on the shortest distance and an angle of each of the two forward nodes with respect to the corresponding keyword; and
   determining, by the processor, a document layout of the document by:
      determining, by the processor, a cluster from a plurality of clusters based on the feature matrix using a machine learning clustering model,
         wherein the each of the plurality of clusters correspond to a unique document layout from a plurality of document layouts, and
         wherein the machine learning clustering model is trained based on training data comprising a plurality of documents corresponding to each of the plurality of document layouts.

2. The method of claim 1, comprises determining a document type from a plurality of document types based on the determined set of unique keywords and the determined document layout of the document.

3. The method of claim 1, wherein each of the plurality of document types corresponds to a predefined unique set of keywords and a pre-defined number of keywords.

4. The method of claim 1, wherein the predefined list of keywords comprises a plurality of aliases corresponding to each of keyword, wherein each of the plurality of aliases is assigned a pre-defined search priority.

5. The method of claim 1, wherein each keyword in the set of unique keywords is determined based on the pre-defined search priority of the at least one alias from the plurality of aliases.

6. The method of claim 1, wherein the detection of the at least one alias in the plurality of line-text data comprises:
splitting, by the processor, the line-text data into one or more tokens based on detection of a predefined delimiter and/or an n-gram technique.

7. A system of classifying a document, the system comprising:
a processor; and
a memory communicably coupled to the processor, wherein the memory stores processor-executable instructions, which, on execution by the processor, cause the processor to:
determine line-text data for each of a plurality of lines of the document using a text extraction technique;
determine a set of unique keywords in the document from a predefined list of keywords based on detection of at least one alias corresponding to each of the set of keywords in the line-text data for each of the plurality of lines,
wherein the set of unique keywords are determined in a pre-defined reading sequence of the plurality of lines of the document;
determine a feature matrix for the set of unique keywords by:
for each keyword in the set of unique keywords:
determine two forward nodes as next two subsequent keywords in the set of unique keywords based on determination of a shortest distance between position of the corresponding keyword and positions of the next two subsequent keywords and based on the pre-defined reading sequence; and
determine weights of each of the two forward nodes based on the shortest distance and an angle of each of the two forward nodes with respect to the corresponding keyword; and
determine a document layout of the document by:
determine a cluster from a plurality of clusters based on the feature matrix using a machine learning clustering model,
wherein the each of the plurality of clusters correspond to a unique document layout from a plurality of document layouts, and
wherein the machine learning clustering model is trained based on training data comprising a plurality of documents corresponding to each of the plurality of document layouts.

8. The system of claim 7, wherein the processor-executable instructions cause the processor to: determine a document type from a plurality of document types based on the determined set of unique keywords and the determined document layout of the document.

9. The system of claim 7, wherein each of the plurality of document types corresponds to a predefined unique set of keywords and a pre-defined number of keywords.

10. The system of claim 7, wherein the predefined list of keywords comprises a plurality of aliases corresponding to each of keyword, wherein each of the plurality of aliases is assigned a pre-defined search priority.

11. The system of claim 7, wherein each keyword in the set of unique keywords is determined based on the pre-defined search priority of the at least one alias from the plurality of aliases.

12. The system of claim 7, wherein the processor-executable instructions cause the processor to:
detect the at least one alias in the plurality of line-text data by splitting the line-text data into one or more tokens based on detection of a predefined delimiter and/or an n-gram technique.

13. A non-transitory computer-readable medium storing computer-executable instructions for classifying a document, the computer-executable instructions configured for:
determining line-text data for each of a plurality of lines of the document using a text extraction technique;
determining a set of unique keywords in the document from a predefined list of keywords based on detection of at least one alias corresponding to each of the set of keywords in the line-text data for each of the plurality of lines,
wherein the set of unique keywords are determined in a pre-defined reading sequence of the plurality of lines of the document;
determining a feature matrix for the set of unique keywords by:
for each keyword in the set of unique keywords:
determining two forward nodes as next two subsequent keywords in the set of unique keywords based on determination of a shortest distance between position of the corresponding keyword and positions of the next two subsequent keywords and based on the pre-defined reading sequence;
determining weights of each of the two forward nodes based on the shortest distance and an angle of each of the two forward nodes with respect to the corresponding keyword; and
determining a document layout of the document by:
determining a cluster from a plurality of clusters based on the feature matrix using a machine learning clustering model,
wherein the each of the plurality of clusters correspond to a unique document layout from a plurality of document layouts, and
wherein the machine learning clustering model is trained based on training data comprising a plurality of documents corresponding to each of the plurality of document layouts.

14. The non-transitory computer-readable medium of claim 13, the computer-executable instructions are configured for:
determining a document type from a plurality of document types based on the determined set of unique keywords and the determined document layout of the document.

15. The non-transitory computer-readable medium of claim 13, wherein each of the plurality of document types corresponds to a predefined unique set of keywords and a pre-defined number of keywords.

16. The non-transitory computer-readable medium of claim 13, wherein the predefined list of keywords comprises a plurality of aliases corresponding to each of keyword, wherein each of the plurality of aliases is assigned a pre-defined search priority.

17. The non-transitory computer-readable medium of claim 13, wherein each keyword in the set of unique keywords is determined based on the pre-defined search priority of the at least one alias from the plurality of aliases.

18. The non-transitory computer-readable medium of claim 13, wherein the computer-executable instructions are configured to detect the at least one alias in the plurality of line-text data by:
   splitting the line-text data into one or more tokens based on detection of a predefined delimiter and/or an n-gram technique.

* * * * *